Feb. 28, 1939.                L. G. GARNSEY                2,148,903
                    ROTARY WATER CLEANSING APPARATUS
                    Filed Dec. 28, 1936          2 Sheets-Sheet 1
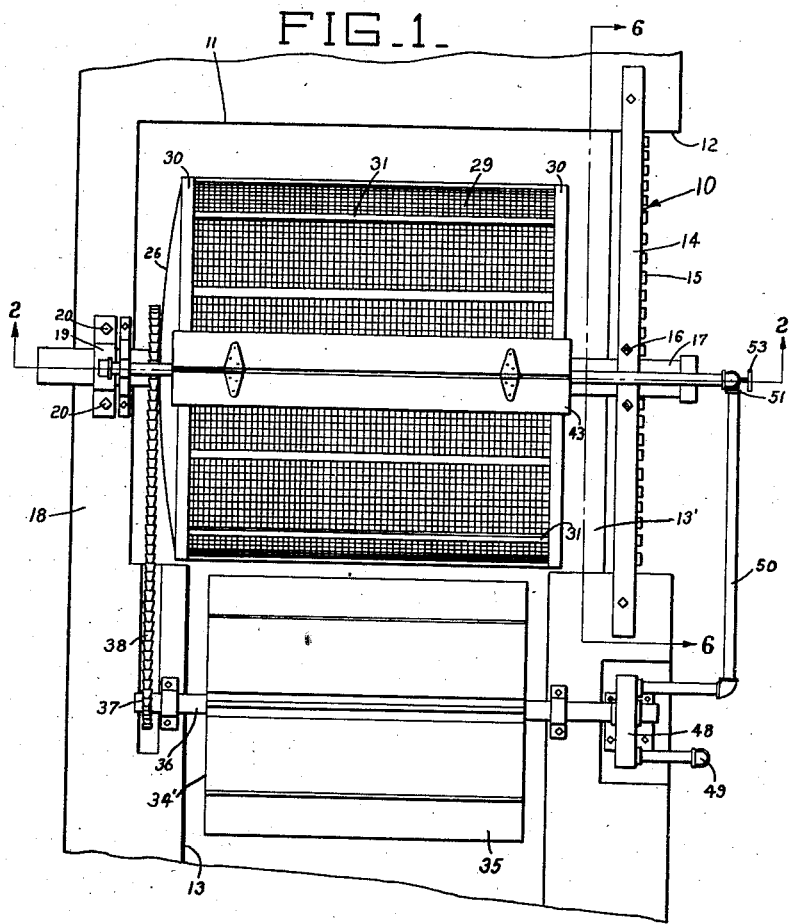
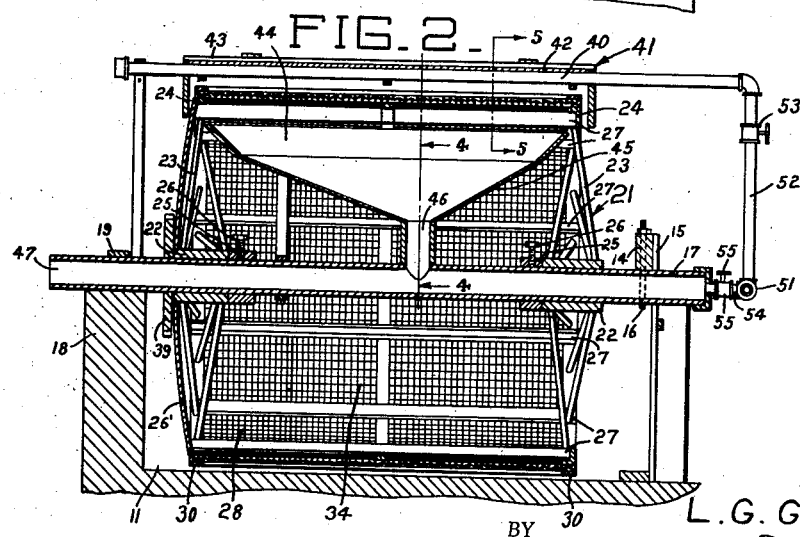
INVENTOR.
L. G. GARNSEY
BY
ATTORNEY.

Feb. 28, 1939.　　　L. G. GARNSEY　　　2,148,903
ROTARY WATER CLEANSING APPARATUS
Filed Dec. 28, 1936　　2 Sheets-Sheet 2
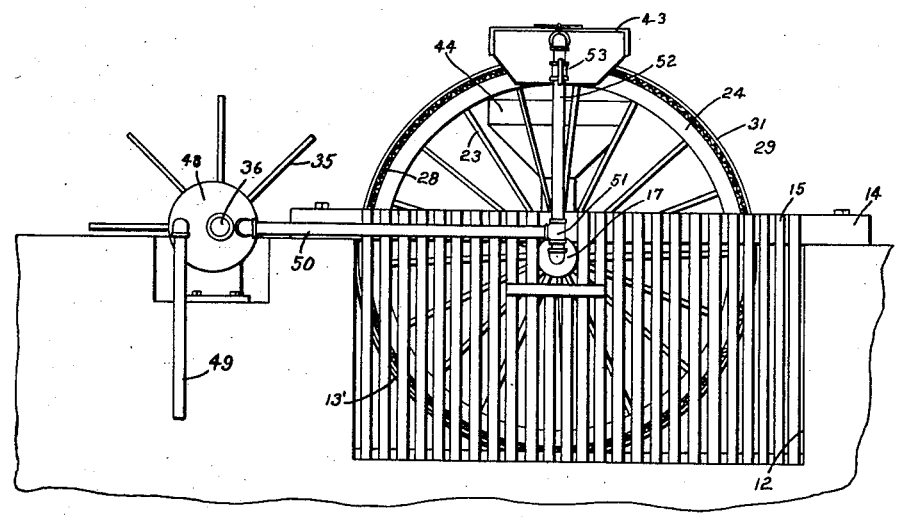
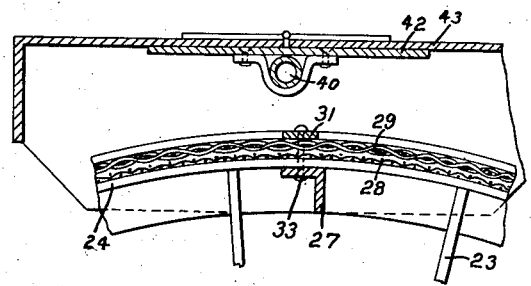
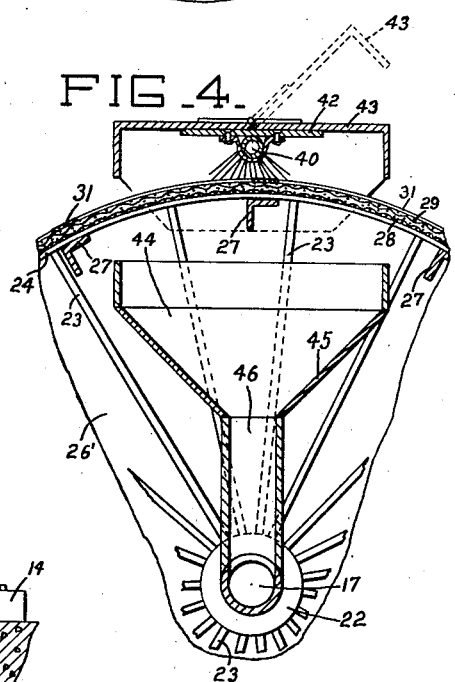
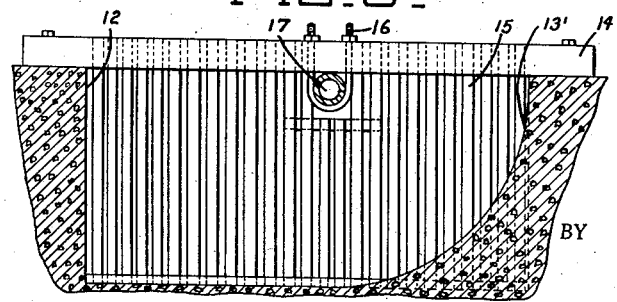
INVENTOR.
L. G. GARNSEY
BY
ATTORNEY.

Patented Feb. 28, 1939

2,148,903

UNITED STATES PATENT OFFICE 2,148,903

ROTARY WATER CLEANSING APPARATUS

Leigh G. Garnsey, Redlands, Calif.

Application December 28, 1936, Serial No. 117,742

3 Claims. (Cl. 210—199)

This invention relates to water cleaning apparatus.

The general object of my invention is to provide an improved apparatus which is adapted to remove refuse material such as solid particles from a stream of water.

A more specific object of my invention is to provide a novelly mounted rotary drum structure for cleaning water.

An additional object of my invention is to provide a novel means for driving a rotary water cleaner.

Another object of the invention is to provide a novel drum construction for use in a water cleaner.

Other objects and the advantages of my invention will be apparent from the following description taken in connection with the accompanying drawings wherein:

Fig. 1 is a top plan view of my water cleaning apparatus;

Fig. 2 is a section taken on line 2—2 Fig. 1;

Fig. 3 is a side elevation;

Fig. 4 is a section taken on line 4—4 of Fig. 2;

Fig. 5 is a section taken on line 5—5 Fig. 2; and

Fig. 6 is a section taken on line 6—6 Fig. 1.

Referring to the drawings by reference characters I have shown my invention as embodied in a water cleaning apparatus which is indicated generally at 10.

As shown the apparatus is intended for use in cleaning water used by municipalities and other large consumers and the apparatus is preferably intended to be placed in a stream. The apparatus includes a tank 11 having an entrance 12 and an exit 13. The half of the bottom nearest the exit 13 is rounded as at 13' to accommodate a drum to be presently described. A bar 14 extends across the entrance and has slats 15 secured thereto to catch waste material of large size.

Mounted on the bar 14 I show a U bolt 16 which engages one end of a tubular member 17. At the other end of the tank the tubular member 17 rests upon a wall 18 of the tank and is shown as secured in place by a clamping member 19 which is held in place by lag screws 20.

Mounted to rotate upon the tubular member 17 I show a pair of wheels indicated generally at 21, each of which includes a hub 22, spokes 23, and a rim 24. The hubs 22 are held in place by collars 25 which have set screws 26 therein engaging the tubular member 17.

On the outer face of the wheel 21 which is remote from the entrance 12 I provide an imperforate plate 26' which extends from the rim to the hub as clearly shown in Fig. 2. The spokes at the other end of the wheel are unobstructed so that water enters the interior of the wheel in the direction of the arrows shown in Fig. 1. In order to catch sediment, sticks, and other waste material which is present in the water, the wheels are connected by a plurality of longitudinally extending angle members 27 which are secured to the rim 24 as shown in Fig. 5.

About these longitudinally extending members 27 I arrange a reticulated wire mesh screen 28 which is preferably of fine texture and on this screen 28 I arrange a second screen 29 which is preferably of coarser mesh and made of coarser strands of wire. About the mesh member 29 at each end I arrange an outer band 30 which serves to hold the mesh members in place and protects their raw edges. The bands 30 are connected by longitudinally extending strips 31 which are secured to the angle members 27 as by bolts 33. This construction provides a mesh drum 34 and the water entering the unobstructed wheel passes into and through this drum and through the outlet 13. A small portion of the water will pass about the drum 34 without passing therethrough but the proportion of parts is such that the amount of uncleaned water is relatively small.

The drum is adapted to be driven by means of a water wheel 34' which is mounted on the outlet 13. This water wheel includes blades 35 which are mounted on a shaft 36 and as the blades dip into the stream passing through the exit 13 the wheel 34' rotates the shaft 36. This shaft 36 has a sprocket 37 secured thereon on which a chain 38 is arranged. This chain also passes over a sprocket 39 which is suitably secured to the tubular member 17 and the construction is such that when the water passes through the exit 13 rotates the water wheel 34' and the chain and sprocket construction causes the drum to be rotated.

As the drum rotates the sediment and other solid material in the water accumulates upon the inner surface of the drum. As the drum rotates the material clings to the drum until the highest point is reached where a spray member 40 including discharge apertures sprays water from the outside of the drum towards its axis to wash the material from the inner surface thereof.

Mounted upon the spray member 40 I arrange a housing indicated generally at 41 and including a base plate 42 on which hinged closures 43 are mounted. The base plate 41 serves to limit a downward movement of the closures 43 but does not interfere with the upper movement thereof so that they can be raised and the apertures in the spray member 40 can be cleaned from accumulated material. The hinged closure also serves to prevent splashing of the water from the spray member.

Directly beneath the spray member I show a funnel 44 which like the spray member extends substantially the full length of the drum. This funnel 44 includes a tapered lower portion 45 which communicates with an inlet member 46 which in turn opens into the tubular member 17 previously described. As a result of this construction the water passing from the discharge member 40 carries out the material collected on the interior of the drum and carries this material into the funnel then into the inlet 46 and to the tubular member 17 whence it is discharged from the open end of the tubular member 17.

To supply water to the spray member 40 I provide a pump 48 which is shown as driven by the shaft 36 (see Fig. 1). The pump 48 includes an inlet 49 which extends into a suitable source of supply as for example the stream being cleaned. The pump includes an outlet 50 which communicates with a T-fitting 51 which is connected to a vertically extending pipe 52 which includes a valve 53. The pipe 52 is connected to the spray member 40 previously described. The T-fitting 51 is also connected to a pipe 54 which includes a valve 55 which discharges into the tubular member 17. When the valve 55 is open and the pump is operating water enters the tubular member 17 to flush the latter.

From the foregoing description it will be apparent that I have invented a novel water cleaning apparatus which can be economically manufactured and which is highly efficient in use.

Having thus described my invention, I claim:

1. In a water cleaning apparatus, a tank, said tank including sides and a closed end, said tank having a bottom, said tank having an open outlet, a tubular member, means to support said tubular member, a pair of hub members rotatably mounted on said tubular member, means to adjustably hold said hub members in position, each of said hub members having spokes radiating therefrom, a rim secured to said spokes to form a wheel, the outer face of the wheel remote from said outlet having an imperforate plate secured to the hub and rim, longitudinal members connecting the rims, a reticulated mesh member overlying the rims and extending from one rim to the other, means engaging the ends of the mesh member and holding them in place, said hub, spokes, rim, mesh member, and longitudinal members forming a cylindrical drum, a funnel member having an inlet communicating with said tubular member, said funnel member extending longitudinally within the drum and having tapering walls, a spray member disposed above the funnel member, said spray member including a plurality of spaced discharge devices, said spray member being disposed without said drum, means to spray water to said spray member, said tubular member including an outlet portion, means to supply a column of water under pressure to the interior of the tubular member remote from the outlet member, and means to rotate said drum.

2. In a water cleaning apparatus, a tank, said tank including sides and a closed end, said tank having a bottom, said tank having an open outlet, a tubular member, means to support said tubular member, a pair of hub members rotatably mounted on said tubular member, means to hold said hub members in position, each of said hub members having spokes radiating therefrom, a rim secured to said spokes to form a wheel, the outer face of the wheel remote from said outlet having an imperforate plate secured to the hub and rim, longitudinally extending angle members secured to the inner face of the rims and running from one rim to the other, a reticulated mesh member overlying the rims and extending from one rim to the other, a band mounted on each rim on the outer surface of the mesh member, said bands engaging the outer ends of the mesh member, longitudinally extending strips connecting said bands, said strips being disposed opposite said angle members, means to secure the strips to the angle members, said hub, spokes, rim, mesh member, angle members and strips forming a cylindrical drum, a funnel member having an inlet communicating with said tubular member, said funnel member extending longitudinally within the drum and having tapering walls, a spray member disposed above the funnel member, said spray member including a plurality of spaced discharge devices, said spray member being disposed without said drum, means to spray water disposed without said drum, means to spray water to said spray member, said tubular member including an outlet portion, means to supply a column of water to the tubular member at the end thereof remote from the outlet member, means to rotate said drum, said spray member including an elongated pipe, a housing mounted on said pipe, said housing including a base plate rigid on the pipe and a pair of hinged closures mounted at each side of the pipe whereby access to the spray members is secured.

3. In a water cleaning apparatus, a tank including bottom, sides and a closed end, said tank having an outlet opposite the closed end, the bottom of the tank nearest the outlet being rounded, a bar extending across the tank above the outlet, a tubular member, means on said bar to support one end of said tubular member, means on the closed end of the tank to support the other end of the tubular member, a pair of hub members rotatably mounted on said tubular member, means to adjustably hold said hub members in position, each of said hub members having spokes radiating therefrom, a rim secured to said spokes to form a wheel, the outer face of the wheel remote from said outlet having an imperforate plate secured to the hub and rim, longitudinally extending angle members secured to the inner face of the rims, a reticulated mesh member overlying the rims and extending from one rim to the other, a band mounted on each rim and engaging the mesh member, longitudinally extending strips connecting said bands, said strips being disposed opposite said angle members, means to secure the strips to the angle members, said hub, spokes, rim, mesh member, angle members and strips forming a cylindrical drum, a funnel member having an inlet communicating with said tubular member, said funnel member extending longitudinally within the drum and having tapering walls, a spray member disposed above the drum and funnel member, said spray member including a plurality of spaced discharge devices, means to supply water to said spray member, said tubular member including an outlet portion, means to supply a column of water to the tubular member at the end thereof remote from the outlet portion, means to rotate said drum, said spray member including an elongated pipe, a housing mounted on said pipe, said housing including a base plate and a pair of hinged closures mounted at each side of the pipe whereby access to the spray member is secured.

LEIGH G. GARNSEY.